(12) United States Patent
Brissette et al.

(10) Patent No.: US 10,892,938 B1
(45) Date of Patent: Jan. 12, 2021

(54) AUTONOMOUS SEMANTIC DATA DISCOVERY FOR DISTRIBUTED NETWORKED SYSTEMS

(71) Applicant: ABB Power Grids Switzerland AG, Baden (CH)

(72) Inventors: Alexander Brissette, Raleigh, NC (US); Mehmet H. Cintuglu, Raleigh, NC (US); Dmitry Ishchenko, Cary, NC (US)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 16/527,502

(22) Filed: Jul. 31, 2019

(51) Int. Cl.
*H04L 12/00* (2006.01)
*H04L 12/24* (2006.01)

(52) U.S. Cl.
CPC ........ *H04L 41/0286* (2013.01); *H04L 41/046* (2013.01); *H04L 41/12* (2013.01); *H04L 41/16* (2013.01)

(58) Field of Classification Search
CPC ... H04L 43/12; H04L 41/0866; G06F 3/0604; H04M 3/5232; H04M 3/42068; G09B 7/00; G06Q 10/06
USPC ........................................ 709/223, 225, 226
See application file for complete search history.

(56) References Cited

U.S. PATENT DOCUMENTS

| | | | | |
|---|---|---|---|---|
| 8,577,018 B1* | 11/2013 | Ben-Yair | .............. | H04M 3/5232 379/142.04 |
| 9,762,444 B1* | 9/2017 | Kim | .................... | H04L 41/0866 |
| 2005/0138167 A1* | 6/2005 | Whitman, Jr. | ......... | G06Q 10/06 709/224 |
| 2008/0155094 A1* | 6/2008 | Roese | ................... | H04L 69/329 709/224 |
| 2009/0161544 A1* | 6/2009 | Kelly | .................... | H04L 43/026 370/232 |
| 2010/0291529 A1* | 11/2010 | Carter | ...................... | G09B 7/00 434/362 |
| 2014/0307863 A1* | 10/2014 | Snyder | .............. | H04M 3/42068 379/265.09 |
| 2015/0019714 A1* | 1/2015 | Shaashua | ............ | H04L 12/2818 709/224 |
| 2015/0304184 A1* | 10/2015 | Ruddick | ................. | H04L 43/12 370/252 |
| 2016/0102878 A1* | 4/2016 | Smith | ..................... | H04L 67/26 700/276 |
| 2016/0285999 A1* | 9/2016 | Koonce | .................... | G06F 16/95 |
| 2016/0291959 A1* | 10/2016 | Searle | .................... | H04L 63/10 |
| 2016/0294614 A1* | 10/2016 | Searle | ..................... | H04L 67/34 |

(Continued)

OTHER PUBLICATIONS

MQTT Version 3.1.1 Plus Errata 01; OASIS Standard; Dec. 10, 2015; 81 pgs.

(Continued)

*Primary Examiner* — Frantz Coby
(74) *Attorney, Agent, or Firm* — Slater Matsil, LLP

(57) ABSTRACT

Systems, methods, techniques and apparatuses for managing distributed applications of networked intelligent agents are disclosed. The agents are operably to autonomously discover semantic profiles and associated data of other agents in a networked system participating in a given application. The agents need not be in direct communication with or known to all the other agents in the networked system.

20 Claims, 4 Drawing Sheets

(56) References Cited

U.S. PATENT DOCUMENTS

2017/0161297 A1* 6/2017 Kaiser ................... G06F 3/0604
2017/0255862 A1* 9/2017 Li ....................... G06F 16/9035

OTHER PUBLICATIONS

Wolfgang Mahnke, Stefan-Helmut Leitner, and Matthias Damm; OPC Unified Architecture; Springer Science & Business Media; Jan. 1, 2009; pp. 209-303.
Data Distribution Service (DDS); Version 1.4; Object Management Group; OMG Document No. formal/2015-04-10; http://www.omg.org/spec/DDS/1.4; Apr. 10, 2015, 180 pgs.
Communication Networks and Systems in Substations, including part 7-4, Basic Communication Structure for Substation and Feeder Equipment—Compatible Logical Node Classes and Data Classes; IEC61850 Int. Electrotech. Committee; Mar. 22, 2003; 237 pgs.
Mehmet H. Cintuglu and Dmitry Ishchenk; Secure Distributed State Estimation for Networked Microgrids; DOI 10.1109/JIOT.2019.2902793; IEEE Internet of Things Journal; Sep. 26, 2018; 9 pgs.

* cited by examiner

AUTONOMOUS SEMANTIC DATA DISCOVERY FOR DISTRIBUTED NETWORKED SYSTEMS

STATEMENT REGARDING FEDERALLY SPONSORED RESEARCH OR DEVELOPMENT

This invention was made with U.S. Government support under Contract No. DE-OE0000831 awarded by the Department of Energy. The Government has certain rights in this invention.

FIELD OF THE INVENTION

The present disclosure relates generally to decentralized data exchange mechanisms between agents of distributed networks implemented with communication protocols. In one embodiment, the agents can discover the identity and capabilities of other agents in the network for participation in a distributed application.

BACKGROUND

Networks of intelligent agents and/or systems are employed in many applications today, such as electric power systems, industrial control systems, access control systems, and the Internet of Things, just to name a few. For example, electric distribution systems are undergoing a transition from centrally managed to distributed and networked systems with independent intelligence and autonomy. Independently controlled, networked microgrids comprised of Distributed Energy Resources (DERs) and loads with one or several points of interconnections to the utility grid can coordinate to support a distribution system using distributed applications like energy trading, optimization and state estimation. These applications are executed by a network of agents representing each microgrid, which may be unaware of the state of the entire network or the neighboring microgrids, especially if they do not share owners.

Therefore, it is possible that the agents of a networked system may not know the identity of other agents that will be included in a given exchange of information for a given application and/or the capabilities of one or more other agents in the network can provide with respect to the application. As a result, further developments in this area are needed.

SUMMARY OF THE DISCLOSURE

Exemplary embodiments of the disclosure include unique systems, methods, techniques and apparatuses for autonomous discovery of semantic profiles and associated data of a plurality of agents in a networked system participating in a given application, saving initial configuration effort, enabling adaptation to network changes, and protecting the privacy of independently owned assets. Further embodiments, forms, objects, features, advantages, aspects and benefits of the disclosure shall become apparent from the following description and drawings.

DETAILED DESCRIPTION OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

Figure 1:
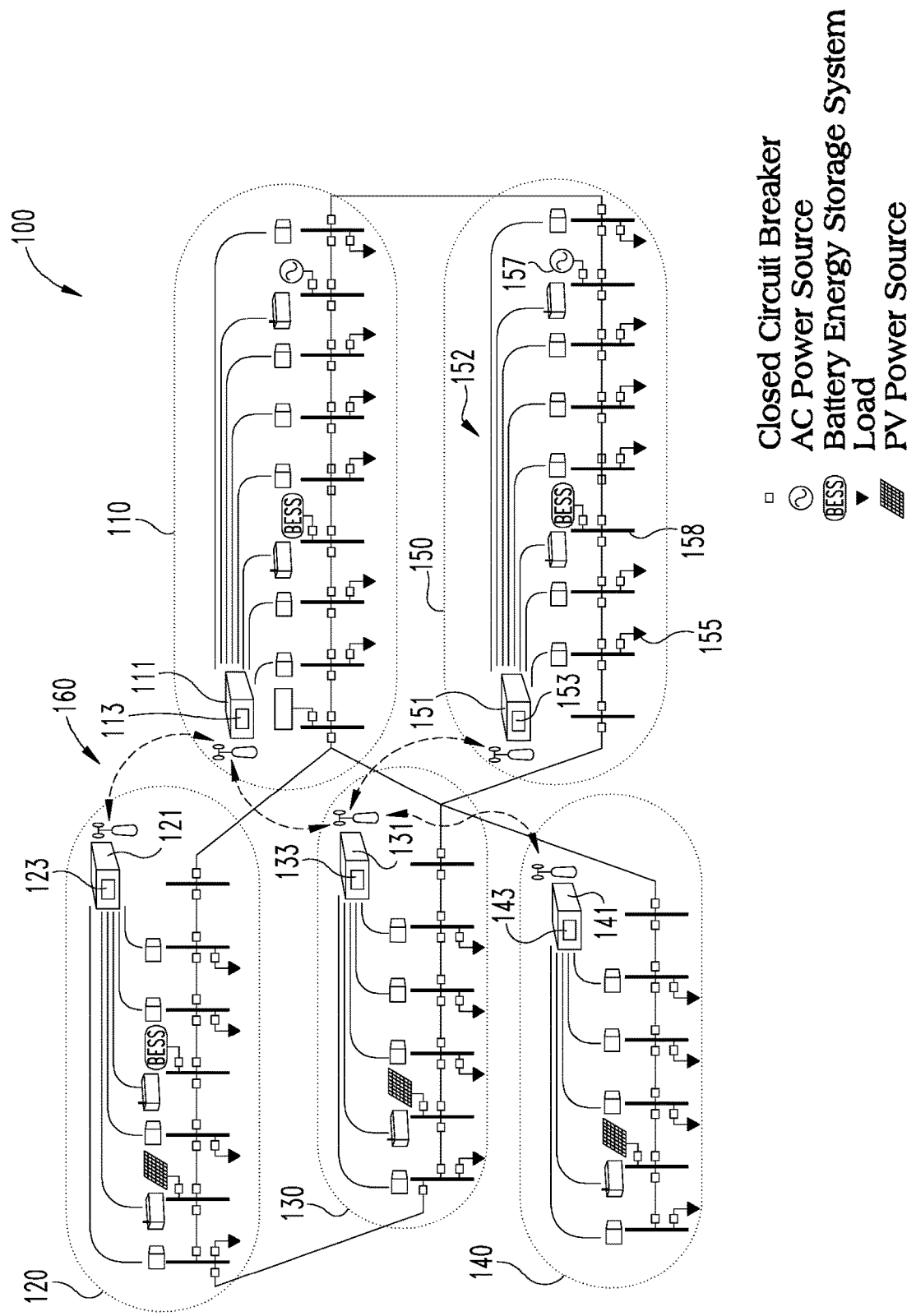
FIG. 1 illustrates an exemplary networked microgrid system with distributed agents.

With reference to FIG. 1, there is illustrated a networked microgrid system 100. It shall be appreciated that system 100 is not limited to networked microgrids, and may be implemented in a variety of applications for distributed systems including networked intelligent agents, including utility grid distribution systems, industrial plant distribution systems, vehicular distribution systems, distributed generation systems and other agents within a microgrid, industrial control systems, Internet of Things, access control systems, and partitioned applications on a single computer, to name but a few examples.

It shall be appreciated that the topology of system 100 is illustrated for the purpose of explanation and is not intended as a limitation of the present disclosure. For example, system 100 may include more or fewer microgrids, and the microgrids of system 100 may be arranged in any configuration, including just a single microgrid with intelligent agents embedded within relays, meters controllers, etc., operating within the microgrid for participating in a distributed application. Furthermore, it shall be appreciated that the topology of each microgrid is illustrated for the purpose of explanation and is not intended as a limitation of the present disclosure. For example, microgrid 110 may include more or fewer buses, more or fewer power sources, more or fewer energy storage devices, more or fewer loads, and more or fewer field devices. Although system 100 is illustrated with a single line diagram, system 100 may be structured to transmit single phase alternating current (AC) power or multiphase AC power, or direct current (DC) power.

In the illustrated example, system 100 includes microgrids 110, 120, 130, 140 and 150. Each microgrid includes at least one load and at least one power source coupled to one of a plurality of buses. Each microgrid includes a plurality of field devices structured to measure electrical or physical characteristics of the microgrid. For example, microgrid 150 includes a plurality of buses including bus 158, a plurality of loads including load 155, an AC power source 157, and a plurality of field devices 152.

AC power source 157 may include a solar panel array, a wind turbine, a natural gas generator, or any other device or system structured to generate power. Load 155 may be any type of device or system structured to consume power. The plurality of field devices 152 may include voltage sensors, intelligent electronic devices (IEDs), remote terminal units (RTUs), relays, reclosers, current sensors, voltage transformers, and current transformers, to name but a few examples.

Each microgrid 110, 120, 130, 140, 150 also includes a microgrid control system 111, 121, 131, 141, 151 coupled to the plurality of field devices by way of a plurality of communication channels. For example, microgrid 150 includes microgrid control system 151, which is coupled to plurality of field devices 152 by way of a plurality of communication channels. Each microgrid control system is structured to monitor electrical and physical characteristics of the microgrid, operate controllable devices in the microgrid, and protect the devices coupled to the microgrid from faults and other conditions.

Each microgrid 110, 120, 130, 140, and 150 includes an intelligent agent 113, 123, 133, 143, 153, respectively, that may be a part of the corresponding control system 111, 121, 131, 141, and 151. The agents 113, 123, 133, 143, 153 each manage the respective microgrid, and are connected to one another in the communication network 160 in the manner described below. Agents 113, 123, 133, 143, 153 operate autonomously and are configured to perform independent computations and communicate with each other by exchanging messages within the communication network 160. For an electrical power system, these agents 113, 123, 133, 143, 153 may be associated with protection relays, meters, distributed energy resource controllers, microgrid supervisory controllers, etc. It should be understood that FIG. 1 only shows an example topology, and agents 113, 123, 133, 143, 153 may be neighbors to some agents and not others, and the neighbor relationships are not limited to the illustrated embodiment.

Figures 2, 3:
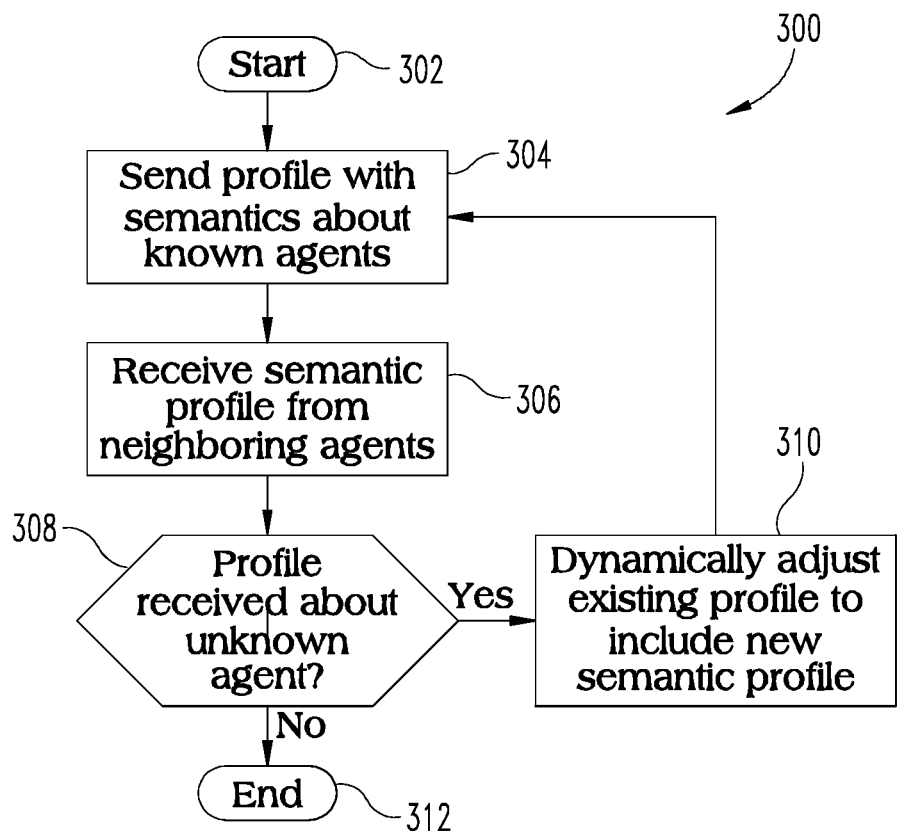
FIG. 2 is a table showing neighbor relationships between the networked microgrids in FIG. 1.
FIG. 3 is a flowchart illustrating an exemplary process for communicating agent semantic profiles and associated data for discovery by other agents in the network.

Referring to FIG. 2, communication network relationships between neighboring microgrids in FIG. 1 is shown in Table 200. Microgrid control systems 111, 121, 131, 141, 151 and/or agents 113, 123, 133, 143, 153 of microgrids 110, 120, 130, 140, and 150, respectively, are structured to communicate by way of a communication network 160 including communication channels coupled with one or more neighboring microgrid control systems. In the illustrated embodiment, microgrid control system 111/agent 113 communicates only with microgrid control systems/agents 121/123 and 131/133; microgrid control system/agent 121/123 communicates only with microgrid control system/agent 111/113; microgrid control system/agent 131/133 communicates only with microgrid control systems/agent 111/113, 141.143, and 151/153; microgrid control system/agent 141/143 communicates only with microgrid control system/agent 131/133; and microgrid control system/agent 151/153 communicates only with microgrid control system/agent 131/133.

The communication channels between agents, between field devices and an agent of a microgrid control system, as well as between field devices within a microgrid, may be wired or wireless. Each communication channel may use standardized communication protocols, such as IEC 61850, OPC UA, Pub-Sub, XMPP, or DDS, to name but a few examples. In certain embodiments, semantics of the exchanged messages may be defined using common knowledge representations known as semantic models.

For example, the Foundation for Intelligent Physical Agents (FIPA) standard implements Agent Communication Language (ACL) to describe the semantics of exchanged messages. The content of an ACL message includes the object of the action and parameters passed through the message. Sender and receiver parameters designate the name of the sender and intended recipient agents. ACL messages express communicative acts such as informing, requesting, refusing, subscribing, and propagating, to name but a few examples. IEC 61850 communication protocols may be extended using non-standardized IEC 61850 logical nodes as Abstract Communication Service Interface (ACSI) based on ACL communication acts, and can be mapped to GOOSE messages.

There are benefits to operating distributed systems with autonomous intelligent agents 113, 123, 133, 143, 153. The distributed systems can coordinate to perform functions or distributed applications that strengthen the resilience of the entire system. For example, distributed applications for distribution systems segmented into a microgrid network include distributed state estimation, optimization, peer-to-peer energy sharing, and system reconfiguration. The resources associated with each agent 113, 123, 133, 143, 153 may be owned and/or operated independently. As a consequence of these features, one or more of the agents 113, 123, 133, 143, 153 may not have knowledge or data about how the other agents interact with any given distributed application(s).

Existing distributed systems suffer from a number of shortcomings and disadvantages. In view of these and other shortcomings in the art, there is a significant need for the unique apparatuses, methods, systems and techniques disclosed herein. As explained in more detail below, the agents 113, 123, 133, 143, 153 of system 100 are each structured to automatically discover the semantic profiles and associated data of all other agents participating in a given distributed application and dynamically update their own profiles to reflect the discovery of other semantic profiles and associated data. As used herein, an agent's semantic profile and associated data includes the information about the agent's capability with respect to a given application.

The solution proposed in the present application is based on communication protocols that allow independent, distributed, and networked agents to exchange information without pre-established links between all agents 113, 123, 133, 143, 153. These may include message-centric protocols between agents that use a client-server mechanism, data-centric protocols with partitioned data spaces, and/or multicast/broadcast protocols that do not use addressing. Without a fixed network, applications must adhere to an agreed format for the structure and content of messages that are transmitted between agents. Following this format, the message for a particular application is the agent's semantic profile. The format may require data to be encoded under a particular "topic" heading. Therefore, an application on one agent can send a message of a particular topic out to the network without a specified recipient agent, and any neighboring agents that are configured to detect and/or are subscribed to that topic on the network will receive the message.

Some protocols achieve this using a message "broker", which is a centralized agent whose only purpose is to marshal messages from publishers (senders) to subscribers (receivers) based on topics. Other protocols use a distributed "data space", where all agents 113, 123, 133, 143, 153 share their topics, but not necessarily their semantic profile data, in an initial network discovery process. Applications in such a network may also be distributed across partitioned data spaces, so that agents may not necessarily share topics with all other agents. In these cases, an agent can receive data from another agent on the network without a direct communication link having been previously established. Unlike data centric and multicast/broadcast protocols, client-server protocols use addresses so that agents know the identities of neighboring agents. However, from one execution of an application to another, each agent 113, 123, 133, 143, 153 may not have information regarding the capabilities of their neighboring agents, or whether the neighboring agents are participating in the application. The agents 113, 123, 133, 143, 153 also do not necessarily include information about the rest of the network, nor can they communicate with non-neighboring agents.

With reference to FIG. 3, there is illustrated a process 300 for communicating agent semantic profile data in order for all agents to discover the other agents in a network and their capabilities with respect to a particular application. The following description of process 300 is made with reference to networked microgrid system 100 illustrated in FIG. 1. Specifically, the description of process 300 is made with reference to one microgrid control system, but it is to be understood that each microgrid control system of networked microgrid system 100 executes process 300 at the same time. Process 300 may be used in combination with other forms of networked microgrid systems and other distributed systems disclosed herein. It shall be further appreciated that a number of variations and modifications to process 300 are contemplated, including, for example, the omission of one or more aspects of process 300, the addition of further conditionals and operations, and/or the reorganization or separation of operations and conditionals into separate processes.

Process 300 includes start operation 302 where to begin, the semantic profiles and associated data, and possibly the participation, of the entire population of agents is unknown to among one or more of the agents 113, 123, 133, 143, 153. Process 300 proceeds to operation 304 where each agent 113, 123, 133, 143, 153 sends its semantic profile data as it relates to the application out to the network, whether as a multicast/broadcast, as a "publication", or directly to a neighboring agent(s), encoded under a previously agreed-upon topic.

Once all the messages have been sent, at process 300 continues at operation 306 where each agent 113, 123, 133, 143, 153 receives the semantic profile data from each neighbor agent thereof. At operation 306 each agent 113, 123, 133, 143, 153 will also learn the presence, identity, and profiles of its neighbor agent(s). In the example of system 100 in FIG. 1, agent 113 will learn the semantic profiles and associated data of agents 123 and 133, agent 123 will learn the semantic profile and associated data of agent 113, agent 133 will learn the semantic profiles and associated data for agents 143 and 153, agent 143 will learn the semantic profile and associated data for agent 133, and agent 153 will learn the semantic profile and associated data for agent 133.

In addition, each agent 113, 123, 133, 143, 153 extends its profile to include the profile information of its neighbor agents while formulating a new message. In the example, agent 113 will prepare a new message that will include its original profile, plus the profiles of agents 123 and 133 that are communicated to it. When the new messages are sent by the agents 113, 123, 133, 143, 153, each agent 113, 123, 133, 143, 153 subscribed to the topic will capture data about their neighboring agents as well as other agents that are included in its neighbor agent profiles.

Process 300 continues at conditional 308 to iteratively determine if the semantic profiles received by the respective agent 113, 123, 133, 143, 153 include any semantic profile data about an agent that is currently unknown to the receiving agent. In the example provided herein, agent 123 will receive data about the semantic profile of known, neighbor agent 113 as before, and also about agent 133 because agent 113 included the semantic profile data of agent 133 in its message to agent 123.

If conditional 308 is YES, process 300 continues at operation 308 to dynamically adjust the existing profile of the agent to include new semantic profile data contained in the message. In the example discussed herein, the known semantic profile data related to agent 113 can be ignored by agent 123, but the new semantic profile data of the non-neighbor agent 133 will be added to the semantic profile of agent 123 because agent 123 will recognize that it has not received the semantic profile data of agent 133. If conditional 308 is NO because no unknown agent semantic profile data is received, process 300 ends at 312.

Figure 4:
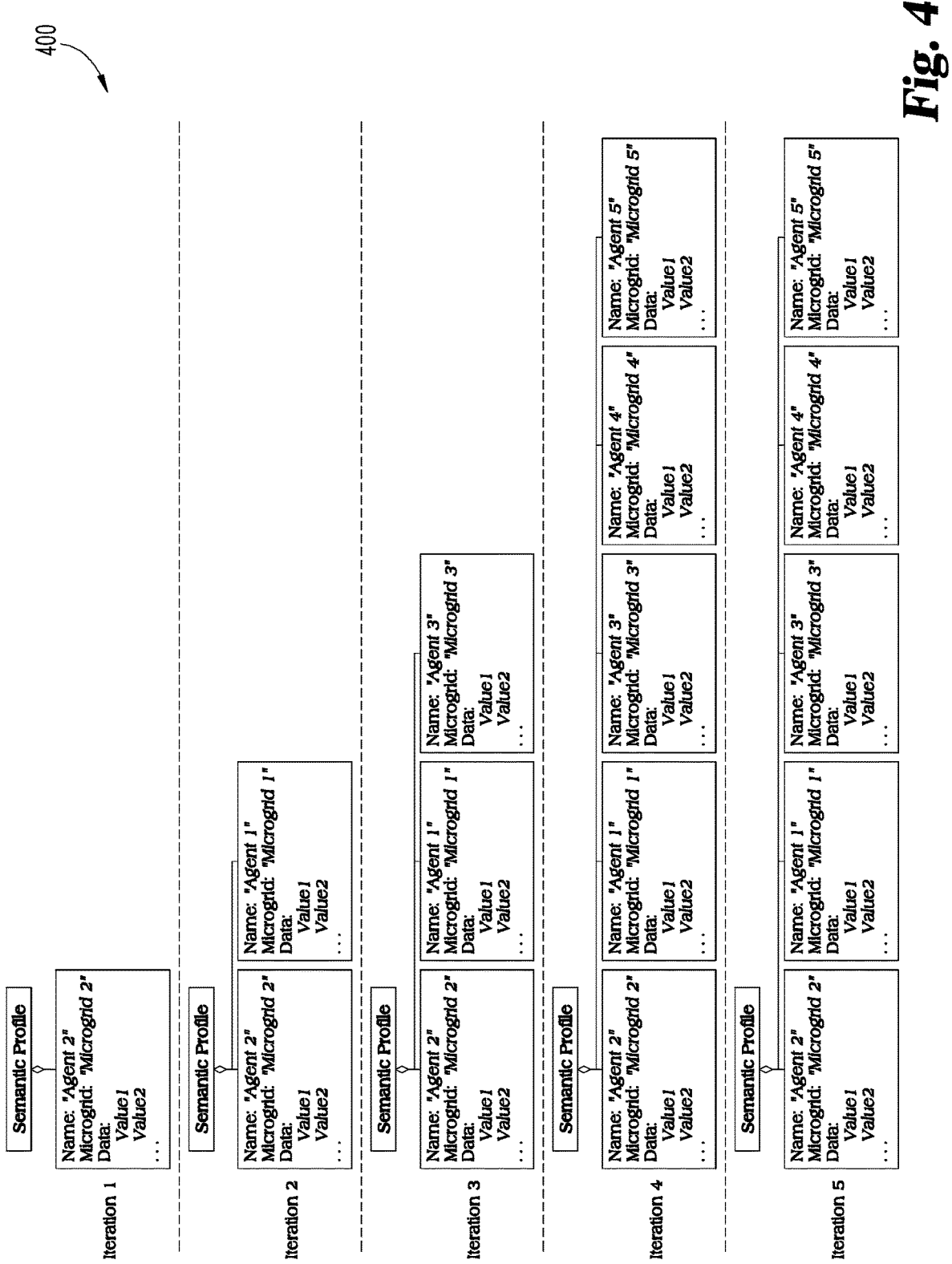
FIG. 4 is a chart showing iterations of messages sent by one agent in the networked system in FIG. 1 during a semantic profile discovery process.

With reference to FIG. 4, there is a table 400 illustrating the example agent 123 and each iteration of new messages being sent and received at agent 123 until discovery of all the agents that are unknown to agent 123 is complete. Since each agent 113, 123, 133, 143, 153 continuously sends messages, each time the agent 123 receives a message its semantic profile is extended with newly discovered semantic profile data for previously unknown agents. Each agent 113, 123, 133, 143, 153 will therefore gradually learn the semantic profiles and associated data of the other agents in the network. Each agent 113, 123, 133, 143, 153 can filter incoming messages for semantic profile data about agents it has not detected before. Eventually, all agents 113, 123, 133, 143, 153 will have no new semantic profile data capture, indicating that the discovery process is complete.

Extending a semantic profile to include new data using process 300 may be as simple as appending the new semantic data to the next message. Some communication protocols, such as IEC 61850, use highly specified capability description data models to describe how an agent interacts with an application. The present disclosure makes use of a dynamic data model concept to reconfigure a capability description at each agent 113, 123, 133, 143, 153 of system 100 to include the sematic profiles known by a neighboring agent upon receiving the neighbor's message.

Process 300 is an iterative process for application agents 113, 123, 133, 143, 153 to receive semantic profile data from neighboring agents, append their neighboring agent data to their own semantic profiles, and send the updated semantic profiles again to their neighboring agents. Process 300 determines that the agent discovery is complete when the extended semantic profile data received by all agents 113, 123, 133, 143, 153 have not changed since the last iteration. The process 300 can be used in almost any communications network environment, including client-server, publisher-subscriber, and multicast/broadcast.

Process 300 can employ a "discovery" message topic to allow agents to discover the presence and semantic profiles of other agents with respect to a particular distributed application. When an agent learns about a neighboring agent by receiving a "discovery" message, the first agent extends its profile to include the newly discovered semantic profile data, then it sends out a new message with the extended semantic profile. Over the course of the iterations of updating its semantic profile and sending updated messages with extended, updated semantic profiles, an agent may learn about more distant agents because its neighbor included the previously unknown agent's semantic profile data in its extended semantic profile. Eventually, all agents will discover the profiles of all other agents, and when no new information is contained in the messages being exchanged, the process 300 is complete.

The present disclosure is valuable for electrical power systems and other systems that use distributed, networked agents to provide measurement and control functionality to support the system. The networked agents host applications that enhance the cybersecurity, resilience, efficiency, and other capabilities of the distribution system and are executed in a distributed manner across the network. In such applications, it is necessary for the agents 113, 123, 133, 143, 153 to know about the identity and capabilities of other agents so they can communicate and coordinate with each other. The present disclosure proposes a way to achieve discovery of agents 113, 123, 133, 143, 153 that protects the privacy of the devices and is adaptive to changes in the network.

This specific example in the present disclosure uses agents 113, 123, 133, 143, 153 representing networked microgrids as an example, but the present disclosure is not limited to such systems. Networked microgrid applications that use the discovery process 300 disclosed herein may require the participation of any number of agents in the network. The discovery process 300 is used to find a neighbor microgrid (i.e. connected by a low-impedance electrical connection) that can share energy and to identify how much energy can be shared.

In many cases the number of participating agents may not be known in advance. As an example, distributed state estimation application for an electric power system needs all agents to participate, and agents may not necessarily know in advance how many other agents are connected to the network, or how many states are being estimated, when the application is initiated. In other cases, such as energy trading, the application may be a peer-to-peer transaction between two agents.

The present disclosure allows systems with distributed intelligence to improve the operation of the entire system by allowing the system to be highly flexible and reconfigurable. Local, independent management of agents eliminates a single point of failure while providing security and privacy for independently owned agents. Applications for improving system operation are distributed between intelligent agents that represent the networked systems of agents and coordinate over a communication network.

In order to gain the advantages of flexibility and privacy that a distributed system of agents provides over a centrally controlled system, the full set of profiles and capabilities among all agents should be known before running a particular distributed application. The agents must discover the identity and profiles of other agents, which may have changed since the last time the application ran. The semantic profile data discovery process 300 can run fast and automatically, while respecting the privacy of independently owned resources. For applications that may need to run periodically by the networked devices, the present disclosure addresses issues of scale, bandwidth limitations, privacy constraints, and other issues that arise in centrally controlled systems where it may not be feasible to propagate in one step all relevant changes to all the devices that participate in the application.

The solution proposed in the present disclosure is based on communication technologies that allow independent, networked applications to exchange information without pre-established links between all agents in the system. In order for a distributed application to be executed by networked agents, each agent learns the application-specific semantic profiles and associated data of the other agents with whom they will be coordinating. When an agent sends a message with its semantic profile data over the network, the semantic profile data follows a predefined format and data model relevant to the application agreed upon by all agents.

In the case of publish-subscribe protocols, agents can filter network traffic for messages relating to the chosen topic, and they can receive a semantic profile and associated data from another agent without knowing the identity or location of that agent in advance. In the case of a client-server protocol, the senders and receivers are predefined, but the profile content is not.

In a network that uses a publish-subscribe protocol and an agreed-upon discovery topic, agents are able to discover the application semantic profiles and associated data of all other agents in a number of iterations that scales only linearly with the size of the network. Agents do not need to know anything in advance of the process except the topic. This greatly simplifies the effort to set up a distributed intelligence application, as the application and communication process can adapt to any changes in the network. For example, if a new agent is added, the other agents do not have to change the manner in which they run the application, and the new agent does not need to be specially engineered to participate in the application.

Networks may also use a client-server protocol or other protocol in which senders and receivers among the agents are known. The present disclosure assumes that the entire network of agents is not known to the agents, as in FIG. 1, but all agents are to participate in the same distributed application. In this case, this present disclosure provides a fast, automated, and easily configured way to initiate the application among all the agents in the network. All agents are allowed to learn the profiles and capabilities of all other agents while only exchanging data with their predefined neighbors. If the network changes, the discovery process does not need to be reconfigured.

As one specific example relating to the system 100 shown in FIG. 1, a distributed state estimation application is provided on the agents 113, 123, 133, 143, 153 that improves system security. The global state estimate is a vector generated by each agent 113, 123, 133, 143, 153, with one value for every bus in the network across all microgrids. In order to determine the length of the vector, an agent 113, 123, 133, 143, 153 must know the total number of microgrids, and the number of buses in each microgrid. If the length is fixed, the application cannot adapt to any reconfigurations in the system. Using the process described herein, each agent 113, 123, 133, 143, 153 learns the total number of buses over the course of several iterations as it discovers new microgrids/agents. This could be accomplished by including the number of buses as an attribute in the semantic profile, for example by setting one of the "Value" fields in FIG. 4 to the number of buses.

Specific intra-microgrid applications may also make use of the semantic discovery process 300. For example, a microgrid may have a distributed fault detection, isolation, and restoration (FDIR, a.k.a. fault location, isolation, and service restoration, or FLISR) application that mitigates the impact of a fault inside the microgrid. In a distributed FDIR application, agents distributed geographically throughout the microgrid would communicate and coordinate to perform the fault mitigation functions. High performance of the application would rely on all participating agents having up-to-date knowledge of the presence and capabilities of other participating agents. Therefore, the semantic profile data process 300 described herein can be executed periodically (or triggered by some other means) to keep the agents informed of the other agents in case a fault occurs.

Another example of an intra-microgrid application is "black start" application, where service is restored to the microgrid following a complete blackout using resources within the microgrid. In this application, distributed agents may communicate and coordinate the black start process in order to minimize downtime, maintain system stability, maximize use of renewables, and for other reason. In order for the application to succeed, the agents must know the presence and capabilities of other participating agents. Therefore, the semantic profile data discovery process 300 may be run as a first step in the black start process.

Figure 5:
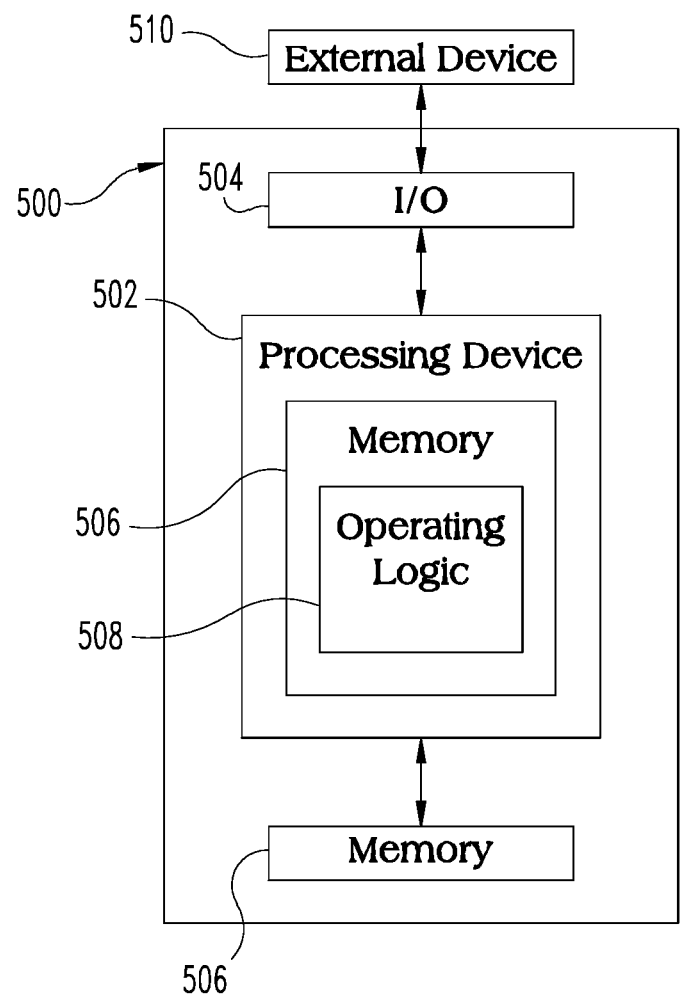
FIG. 5 is a block diagram illustrating an exemplary control system.

With reference to FIG. 5 there is illustrated a schematic block diagram of an exemplary control system 500 such as one of the agents 113, 123, 133, 143, 153 of system 100 in FIG. 1. Control system 500 includes a processing device 502, an input/output device 504, memory device 506, and operating logic 508. Furthermore, the computing device 500 communicates with one or more external device 510, including other agents or control systems in a distributed system or local field devices. Control system 800 may be a stand-alone device, an embedded system, or a plurality of devices structured to perform the functions described with respect to system 500.

Input/output device 504 enables control system 500 to communicate with local field devices or other agents or control systems. Input/output device 504 may include a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 504 may include more than one of these adapters, credentials, or ports, such as a first port for receiving data and a second port for transmitting data.

Processing device 502 may include one or multiple processors, Arithmetic-Logic Units (ALUs), Central Processing Units (CPUs), Digital Signal Processors (DSPs), or Field-programmable Gate Arrays (FPGAs), to name but a few examples. For forms of processing devices with multiple processing units, distributed, pipelined, or parallel processing may be used. Processing device 802 may be dedicated to performance of only the operations described herein or may be used in one or more additional applications. Processing device 502 may be of a programmable variety that executes algorithms and processes data in accordance with operating logic 508 as defined by programming instructions (such as software or firmware) stored in memory 506. Alternatively or additionally, operating logic 508 for processing device 502 is at least partially defined by hardwired logic or other hardware. Processing device 502 may comprise one or more components of any type suitable to process the signals received from input/output device 504 or elsewhere, and provide desired output signals. Such components may include digital circuitry, analog circuitry, or a combination of both.

Memory device 506, also known as a computer readable medium, may be of one or more types of memory, such as a solid-state variety, electromagnetic variety, optical variety, or a combination of these forms, to name but a few examples. Furthermore, memory device 506 may be volatile, nonvolatile, transitory, non-transitory or a combination of these types, and some or all of memory device 506 may be of a portable variety, such as a disk, tape, memory stick, or cartridge, to name but a few examples. In addition, memory device 506 may store data that is manipulated by operating logic 508 of processing device 502, such as data representative of signals received from and/or sent to input/output device 504 in addition to or in lieu of storing programming instructions defining operating logic 508, just to name one example. Memory device 506 may be included with processing device 502 and/or coupled to processing device 502.

Further written description of a number of exemplary aspects of the present disclosure and various embodiments shall now be provided. According to one aspect, a method for discovery of semantic data of a plurality of agents in a distributed networked system is provided. The method includes sending a semantic profile with associated data for each of the plurality of agents to one or more receiving agents that are in direct communication with one or more of sending agents; receiving, at each of the one or more receiving agents, the semantic profile and associated data from the respective one or more sending agents; in response to determining at the one or more receiving agents that the received semantic profile includes an unknown semantic profile and associated data for an unknown agent, updating the semantic profile of the one or more receiving agents to include the unknown semantic profile and associated data for the unknown agent; after updating the semantic profile of the one or more receiving agents, iteratively sending, receiving and updating the semantic profiles of the plurality of agents until none of the receiving agents receive semantic profile and associated data that include an unknown semantic profile and associated data for an unknown agent.

In one embodiment of the method, initially at least two or more of the plurality of agents are unknown agents to at one of the plurality of agents. In another embodiment, each of the plurality of agents is autonomous and communicates with the other of the plurality of agents by exchanging messages that include the updated semantic profiles. In yet another embodiment, the semantic profile and associated data includes data regarding the capability of the corresponding agent relative to an application on each of the plurality of agents.

In another embodiment of the method, the agents communicate via one of client-server, publisher-subscriber, and multicast/broadcast communication protocols. In yet another embodiment, each of the agents comprises a control system including a processing device, an input/output device, a memory device, and operating logic for performing the method. In a further embodiment, the distributed networked system includes a plurality of microgrids and each of the agents is associated with a respective one of the plurality of microgrids. In another embodiment, the distributed networked system includes a plurality of devices within a microgrid and each of the agents is associated with a respective one of the devices.

According to another aspect, a method for discovery of one or more agents in a distributed networked system is provided. The method includes operating a first agent of a first control system, a second agent of a second control system, and a third agent of a third control system; sending a first message with the first control system, the first message having a first semantic profile and associated data of the first agent; receiving the first message at the second control system; adding the first semantic profile and associated data of the first agent to a second semantic profile of the second agent; sending a second message with the second control system, the second message including the first and second semantic profiles and associated data; receiving the second message at the third control system; and adding the first semantic profile and associated data of the first agent to a third semantic profile of the third agent in response to receiving the second message at the third control system.

In one embodiment, the method includes determining the semantic profile and associated data of the first agent is unknown to the third agent before adding the first semantic profile and associated data of the first agent to the third semantic profile of the third agent. In a refinement of this embodiment, the method includes sending and receiving messages with the first, second, and third control systems to update the first semantic profile of the first agent, the second semantic profile of the second agent, and the third semantic profile of the third agent with semantic profiles and associated data of one or more other agents until none of the first, second, and third control systems receive an unknown semantic profile and associated data of the one or more other agents.

In another embodiment of the method, each of the control systems operates an associated microgrid. In yet another embodiment, each of the control systems operates an associated device within a microgrid. In still another embodiment, the first control system is not in direct communication with the third control system.

In another embodiment, the method includes sending a third message with the third control system, the third message including the first, second, and third semantic profiles; receiving the third message at a fourth control system including a fourth agent; determining at least one of the first, second, and third semantic profiles and associated data is unknown to the fourth agent; and adding the at least one unknown semantic profile and associated data to a fourth semantic profile of the fourth agent.

According to another aspect, a non-transitory computer readable medium includes a set of instructions structured to be executed by a processing device of a first control system of a first agent effective to: send a first message including at least a first semantic profile and associated data to at least one receiving agent that is in direct communication with the first agent; receive a second message including at least a second semantic profile and associated data from at least one sending agent that is in direct communication with the first agent; determine the second semantic profile and associated data is for an unknown agent to the first agent; update the first semantic profile of the first agent to include the semantic profile and associated data for the unknown agent; and send a third message including the first semantic profile and associated data and the second semantic profile and associated data to the at least one receiving agent.

In one embodiment, the set of instructions are structured to be executed by the processing device are effective for the first agent to iteratively update the semantic profile of the first agent with semantic profiles received in messages from the at least one sending agent until none of the messages include a semantic profile and associated data for an unknown agent. In another embodiment, the semantic profile and associated data includes data regarding the capability of the corresponding agent relative to an application on each of the agents.

In yet another embodiment, the set of instructions structured to be executed by the processing device are effective to determine a value for each semantic profile received at the first agent. In another embodiment, the first agent is configured to communicate via one of a client-server, a publisher-subscriber, and a multicast/broadcast communication protocol with the at least one receiving agent and the at least one sending agent.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

For the purposes of clearly, concisely and exactly describing non-limiting exemplary embodiments of the disclosure, the manner and process of making and using the same, and to enable the practice, making and use of the same, reference has been made to certain exemplary embodiments, including those illustrated in the figures, and specific language has been used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A method for discovery of semantic data of a plurality of agents in a distributed networked system, the method comprising:

sending a semantic profile with associated data for each of the plurality of agents to one or more receiving agents that are in direct communication with one or more of sending agents;

receiving, at each of the one or more receiving agents, the semantic profile and associated data from the respective one or more sending agents;

in response to determining at the one or more receiving agents that the received semantic profile includes an unknown semantic profile and associated data for an unknown agent, updating the semantic profile of the one or more receiving agents to include the unknown semantic profile and associated data for the unknown agent; and after updating the semantic profile of the one or more receiving agents, iteratively sending, receiving and updating the semantic profiles of the plurality of agents until none of the one or more receiving agents receive any semantic profile and associated data that includes any unknown semantic profile and associated data for any unknown agent.

2. The method of claim 1, wherein initially at least two or more of the plurality of agents are unknown agents to at one of the plurality of agents.

3. The method of claim 1, wherein each of the plurality of agents is autonomous and communicates with others of the plurality of agents by exchanging messages that include the updated semantic profiles.

4. The method of claim 1, wherein the semantic profile and associated data includes data regarding a capability of the corresponding agent relative to an application on each of the plurality of agents.

5. The method of claim 1, wherein the agents communicate via one of client-server, publisher-subscriber, and multicast/broadcast communication protocols.

6. The method of claim 1, wherein each of the agents comprises a control system including a processing device, an input/output device, a memory device, and operating logic for performing the method.

7. The method of claim 1, wherein the distributed networked system includes a plurality of microgrids and each of the agents is associated with a respective one of the plurality of microgrids.

8. The method of claim 1, wherein the distributed networked system includes a plurality of devices within a microgrid and each of the agents is associated with a respective one of the devices.

9. A method for discovery of one or more agents in a distributed networked system, comprising:
operating a first agent of a first control system, a second agent of a second control system, and a third agent of a third control system;
sending a first message with the first control system, the first message containing a first application-specific semantic profile and associated data of the first agent;
receiving the first message at the second control system;
adding the first application-specific semantic profile and associated data of the first agent to a second application-specific semantic profile of the second agent;
sending a second message with the second control system, the second message containing the first and second application-specific semantic profiles and associated data;
receiving the second message at the third control system; and
adding the first application-specific semantic profile and associated data of the first agent to a third application-specific semantic profile of the third agent in response to receiving the second message at the third control system.

10. The method of claim 9, further comprising determining the first application-specific semantic profile and associated data of the first agent is unknown to the third agent before adding the first application-specific semantic profile and associated data of the first agent to the third application-specific semantic profile of the third agent.

11. The method of claim 10, further comprising sending and receiving messages with the first, second, and third control systems to update the first application-specific semantic profile of the first agent, the second application-specific semantic profile of the second agent, and the third application-specific semantic profile of the third agent with application-specific semantic profiles and associated data of one or more other agents until none of the first, second, and third control systems receive an unknown application-specific semantic profile and associated data of the one or more other agents.

12. The method of claim 9, wherein each of the control systems operates an associated microgrid.

13. The method of claim 9, wherein each of the control systems operates an associated device within a microgrid.

14. The method of claim 9, further comprising:
sending a third message with the third control system, the third message containing the first, second, and third application-specific semantic profiles;
receiving the third message at a fourth control system including a fourth agent;
determining at least one of the first, second, and third application-specific semantic profiles and associated data is unknown to the fourth agent; and
adding the at least one unknown application-specific semantic profile and associated data to a fourth application-specific semantic profile of the fourth agent.

15. The method of claim 9, wherein the first control system is not in direct communication with the third control system.

16. A non-transitory computer readable medium, comprising:
a set of instructions structured to be executed by a processing device of a first control system of a first agent effective to:
send a first message including at least a first semantic profile and associated data to at least one receiving agent that is in direct communication with the first agent;
receive a second message including at least a second semantic profile and associated data from at least one sending agent that is in direct communication with the first agent;
determine the second semantic profile and associated data is for an unknown agent to the first agent;
update the first semantic profile of the first agent to include the second semantic profile and associated data for the unknown agent; and
send a third message including the first semantic profile and associated data and the second semantic profile and associated data to the at least one receiving agent.

17. The non-transitory computer readable medium of claim 16, wherein the set of instructions structured to be executed by the processing device are effective for the first agent to:
iteratively update the first semantic profile of the first agent with semantic profiles received in messages from the at least one sending agent until none of the messages includes any semantic profile and associated data for any unknown agent.

18. The non-transitory computer readable medium of claim 16, wherein each semantic profile and associated data includes data regarding a capability of the corresponding agent relative to an application on each of the agents.

19. The non-transitory computer readable medium of claim 16, wherein the set of instructions structured to be executed by the processing device are effective to determine a value for each semantic profile received at the first agent.

20. The non-transitory computer readable medium of claim 16, wherein the first agent is configured to communicate via one of a client-server, a publisher-subscriber, and a multicast/broadcast communication protocol with the at least one receiving agent and the at least one sending agent.

\* \* \* \* \*